Aug. 12, 1958

R. KELLY ET AL 2,847,584

REGULATED POWER SUPPLY EQUIPMENTS

Filed May 6, 1955

Inventors
R. KELLY
P. S. KELLY
By *RFMorris*
Attorney

United States Patent Office 2,847,584
Patented Aug. 12, 1958

2,847,584

REGULATED POWER SUPPLY EQUIPMENTS

Richard Kelly and Patrick Stanley Kelly, London, England, assignors to International Standard Electric Corporation, New York, N. Y.

Application May 6, 1955, Serial No. 506,531

Claims priority, application Great Britain May 14, 1954

16 Claims. (Cl. 307—150)

This invention relates to regulated electric power supply equipment with particular reference to such equipment for the supply of direct current power to telecommunication systems.

According to the invention, there is provided regulated electric power supply equipment for the supply of unidirectional current to a load circuit, which comprises a source of unidirectional power, and means for regulating so that the output load current remains constant initially for all output voltages up to a predetermined output voltage, and thereafter suffers continual reduction with continued increase of output voltage up to a maximum output voltage.

Also according to the invention, there is provided regulated electric power supply equipment which is suitable for feeding unidirectional current to one end of a long electrical signal transmission loop circuit such as a submarine cable, the other end of which is fed by another regulated power supply equipment having constant current output characteristic over the complete working range of voltage and which comprises a source of unidirectional power, and regulating means in the first said equipment for maintaining its output current to such a loop circuit constant up to a predetermined output voltage which is below the normal working voltage for such loop circuit and thereafter decreasing with further increase of working voltage whereby at and around such normal working voltage the output current of said equipment will be automatically adjusted to the constant output current of such other distant power supply equipment.

Further according to the invention, there is provided a regulated electric power supply system for the supply of unidirectional current at a predetermined and regulated value to a series of thermionic amplifying equipments interconnected by a telecommunication cable, wherein the unidirectional current consuming devices in the said series of equipments are arranged in a series loop interrupted at each end of the said cable for the insertion therein of a pair of regulated power supply equipments each adapted to supply the said regulated value of current either alone, or jointly with the other equipment so as to share the total load.

The system and equipments of the invention are directed primarily to the supply of power to submarine and coaxial cables from their terminations for the energisation of amplifiers (repeaters) spaced along their length. Such supply may be by alternating current or direct (unidirectional) current, and each system has its advantages and disadvantages. In the present instance, only unidirectional supply is considered, and there are many different ways of feeding power from power units (which are intended to include motor-generator sets) to repeaters connected in tandem in a telecommunications line. The various known possible arrangements are as follows:

(1) Power feeding from one end only at a time.

(2) Duplicate power units operating in parallel and operating from either end.

(3) Power feeding from both ends simultaneously.

(4) Duplicate power units operating in parallel from both ends simultaneously.

There is, however, a fifth arrangement possible which is believed to be novel and which comprises:

(5) A combination of arrangements 1 and 3 above, i. e. power feeding from single units from both ends simultaneously, but in case of failure of a power unit from either end, the power unit at the other end takes over automatically and supplies the total power to the circuit. This forms the basis of the present invention.

Advantages and disadvantages of the above arrangements are listed below:

In arrangements 1 to 4 above it is essential to have a continuous A. C. supply at the stations for providing power to the power units.

In arrangements 1 and 3, a failure of the power unit will cause a break in transmission.

In arrangements 2 and 4, a failure of a power unit is taken care of by the power unit operating in parallel with the failed unit, but in some cases a faulty power unit may shut down the power unit operating in parallel as well. Very high voltage, high speed, D. C. contactors are required.

In arrangement 5 a failure of either the power supply or power unit or both at one end does not affect the operation of the equipment as the repeaters are automatically supplied with power from the other end, so that an expensive "continuous A. C." equipment is not required.

In arrangements 1, 2 and 5 it is essential that the condensers in the repeaters at the feeding end must be capable of withstanding the full voltages of all the repeaters whereas in arrangements 3 and 4 it is only essential for the condensers to withstand approximately 60 to 65% of the total load voltage.

Arrangement 5 is by far the most reliable, the cheapest initially and operationally and has more safeguards than any of the other arrangements described above. This is at the expense over arrangements 3 and 4 but not 1 and 2 of the condensers in the repeaters being required to withstand the full voltage.

The use of the higher voltage condenser is an advantage when locating faults if the failure is near one end and it is essential to test from the far end.

In arrangements 1, 3 and 5 above it is easier to meet the close limits of power required by the repeaters than in 2 or 4.

In arrangements 3 and 4, both units will have to be adjusted to exactly the same current, whereas in 1, 2 and 5, the chief current control is at one end only.

In arrangement 5, as soon as one unit is connected to the line the circuit will be ready for operation, whereas some difficulty may be experienced between the times of switching on the first and second power unit to the line in arrangements 3 and 4.

In arrangement 5 the power supply units are arranged so that one is "Master" and the other "Slave." This can be changed around at will, or as circumstances dictate.

The "master unit" is current controlled to close limits over the whole range from short circuit to full load.

The "slave unit" (with the master facility made inoperative) is arranged for current control at a slightly higher figure than the "master unit" for all voltage outputs up to about 40% to 45% of the total line voltage and from there on, with increasing output voltage, the current is reduced at an approximately constant rate up to full output voltage, so that at about 50% of the total load voltage, the current from the "slave unit" is equal to that of the "master unit."

If the "slave unit" fails in service, either due to unit or power supply failure, then the "master unit" takes over and supplies the total load without interruption or excessive current surges on the line.

If the "master unit" fails, then the "slave unit" takes over and supplies the total load, but when it finds that it is supplying more than a certain proportion of the load, it automatically changes over and becomes a "master," so supplying the correct regulated current to the line.

The power units are connected to the line as "slaves," but as in the case of a "master unit" failing, when one unit finds that it is supplying more than a certain proportion of the full load, it automatically changes over and becomes a "master" and the second unit connected to the line remains as a "slave" unless for some reason it is decided that this second unit must be the "master," in which case the operator at the working "master" end operates the appropriate key which turns his unit into a "slave" so that now there are two "slaves" operating together. It is now opportune for the operator at the other end to operate the appropriate key to turn his "slave unit" into a "master unit."

For satisfactory operational purposes, the "certain proportion of the load" mentioned above is conveniently of the order 80%.

The present invention is based on the use of arrangement 5 discussed above and provides a power unit which may operate singly to supply power to a number of repeaters in tandem, or in conjunction with a second, similar unit situated at the distant end of the tandem connection to share the power required by the repeaters.

The invention will be described with reference to the accompanying drawing illustrating an embodiment.

In the drawing:

Fig. 1 shows a regulated power supply unit which may be adapted for use either as a "master" unit or as a "slave" unit, in the manner previously discussed, for the supply of unidirectional current from an alternating current source.

Terminals 1, 2 are provided for connection to an alternating current source (not shown) and supply a rectifier network RN via the main winding or windings 3 of a saturable reactor (or preferably pair of saturable reactors) MA1. The rectifier network may comprise metal or thermionic or ionic rectifiers arranged in well-known manner, and may include a transformer as required together with smoothing circuits. Output terminals 4, 5 of RN provide unidirectional current for the load circuit, e. g. a telecommunication cable with repeaters therein, not shown, to be connected at terminals 6, 7, the current in one supply lead, e. g. the positive, traversing the main winding MW of electro-magnetic controlling equipment, here represented by a diode V5. This magnetic diode V5 is a simple thermionic diode tube in which the anode current is controlled by one or more external electromagnetic fields, and not by a control electrode, such as a grid.

V5 is connected in cathode follower fashion in a subsidiary circuit supplied with direct current at terminals 8, 9, from any convenient source, not shown, stabilised by gas discharge devices V3, V4, via series resistor R5. Stabilising tubes V3 and V4 are provided thus in duplicate as a safety precaution, in case one tube fails to strike.

Controlling output from V5 cathode, developed on cathode resistor R3, is supplied by resistor R4 to a magnetic (or thermionic) amplifier MA2, which in turn controls MA1, and thus serves to maintain the unidirectional load current constant for both mains voltage and load voltage variations.

An auxiliary controlling winding AW on the diode V5 is provided for giving an auxiliary controlling effect when the equipment is used in the "slave" condition. For use in the "master" condition AW is given a fixed bias current from the auxiliary D. C. supply via relay contacts HV2, HV3, when operated, and in such a direction as to aid the main winding MW. It is known that an auxiliary winding connected so as to oppose the main winding of a magnetic diode increases the sensitivity of control. In the present instance, additive control is necessary for the proper control of the "slave" unit, and the same arrangement must therefore be used for the "master" unit. For use in the "slave" condition, AW is connected into the output supply circuit in one of the ways described below.

Figure 1:
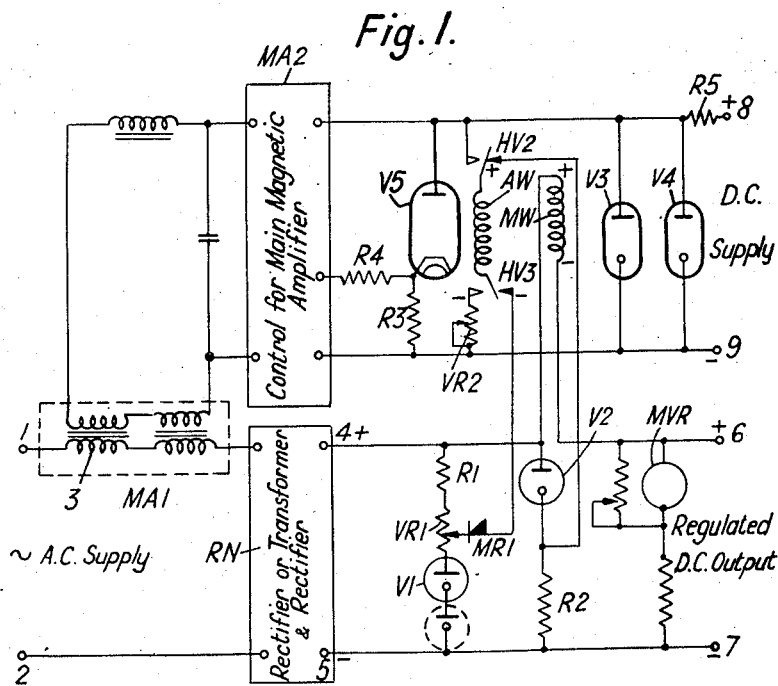
Fig. 1 shows the elements of a regulated power supply unit.
Figure 5:
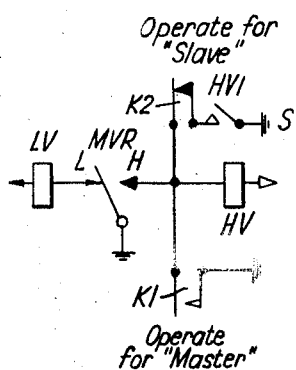
Fig. 5 shows controls for effecting change-over from "master" to "slave" and vice versa.

Contacts HV2, HV3, are contacts of a relay HV shown in Fig. 5, which operates under control of a manually operated key K1, or of a marginal voltmeter relay MVR shown connected across the load circuit in Fig. 1, and having contacts MVR–L and MVR–H in Fig. 5.

Since it is required to supply power to the load from both ends of the telecommunication cable by two separate power cubicles, each cubicle supplying approximately half of the power, it is, therefore, essential to provide some load sharing means, and this is obtained by means of the special voltage control arrangement (described below), operating in conjunction with the current control device outlined above.

In the "master" unit, as stated above, the "AW" coil is connected across the stabilised supply obtained from V3 or V4. The current through this coil is controlled by means of the variable resistance VR2 and is employed for adjusting the regulated current output of the power unit. The current output of the power unit may thus be controlled to within very close limits for mains voltage, frequency and load voltage variations.

Figure 6:
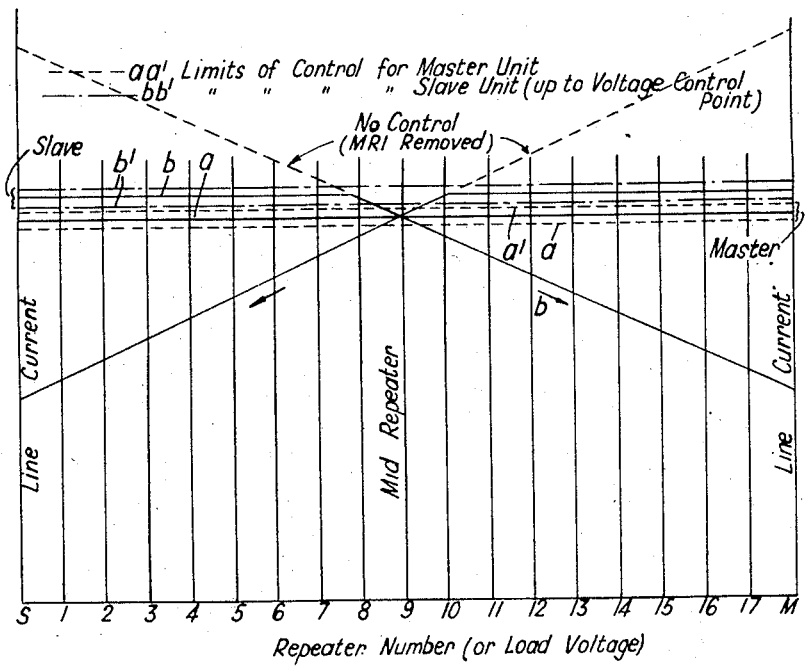
Fig. 6 shows graphs of current regulation for the two types of units.

In the "slave" unit the "AW" coil is connected via the back contacts HV2 and HV3 in the bridge or potentiometer circuit, as shown in Figs. 1–4, and is arranged to give a controlled current (above the normal controlled current of the "master" unit) up to a predetermined output voltage and thence to fall away at a regulated rate. The ideal condition is for the current from the "slave" unit to be equal to that of the "master" unit when supplying half of the total load, but this is not essential. It is possible under certain conditions for two "slave" units to operate in tandem. Fig. 6 shows the regulation curves of both types of units and how they operate in conjunction with each other.

In Fig. 6, the output of the units is shown in terms of "repeater number," which, for a uniformly equipped line, is approximately equivalent to load and to output voltage since, for a given value of load current, the greater the number of repeaters equipped the greater is the driving voltage from the unit required to drive this current value. Thus, for a "master" unit, the current output is regulated to a fixed value $a$, having control limits $a'$, $a'$, from short circuit conditions up to full load, and is thus shown as a solid line $a$ between dashed lines $a'$, $a'$, running from ordinate M to ordinate S.

For the "slave" unit, the output current remains constant at $b$, with control limits of $b'$, $b'$, a value slightly above $a$, for loads just under half the total load, i. e. from ordinate S to repeater 8, and from ordinate M to repeater 10, and then falls away steadily, intersecting with $a$ at repeater 9, the mid repeater.

Figure 2:
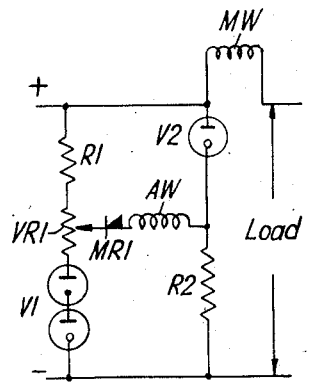
Figs. 2, 3 and 4 show alternative connections for the control in a "slave unit"
Figure 3:
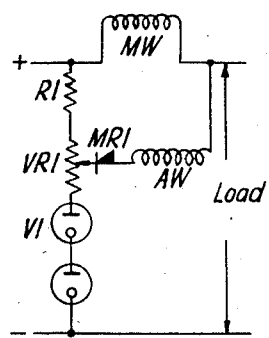
Figure 4:
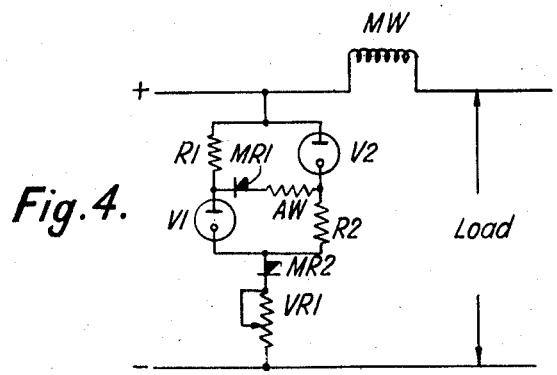

Figs. 2, 3 and 4 show various arrangements for connecting in the auxiliary winding AW to give the desired current/voltage control effect in the "slave." In Fig. 2, which is identical with the arrangement of Fig. 1, and in Fig. 4, AW is connected in as one diagonal of a Wheatstone Bridge network of linear resistors, namely R1, R2, and VR1 (in Fig. 2) and of non-linear resistors such as V1, V2, which may be discharge diodes or other forms of non-linear resistor, the other diagonal of the network being connected in shunt with the output from the unit at a point before the series winding MW. Fig. 4 shows a minor variation in the position of VR1, together with the addition of a unidirectional element MR2. In Fig. 3, only one vertical limb of the bridge is provided, the connection of AW being made to the side of the winding MW remote from the R1–VR1–V1 potentiometer network.

Upon reaching a certain load voltage, the setting of the potentiometer VR1 fixes the point at which the voltage output of the unit commences to take effect. At low voltage outputs, V1 and V2 (or V1, Fig. 3) will strike but the balance of voltage over the steady maintaining voltage and existing across R1 and upper portion of VR1 (or R1, Fig. 4) will be very small, much less than that across V2 or across MW (in Fig. 3; the output current being maintained constant, the voltage drop across MW remains constant). Consequently, no current can flow through AW since MR1 is in the blocking direction for the polarities shown, and MW alone exerts regulating control, which is thus of a current stabilising nature.

Eventually, however, the voltage output from the unit becomes sufficiently great for the polarity at either end of AW to be reversed, the voltage across V1 and V2 (Figs. 2 and 4) remaining steady and that across R1, or R1 and VR1, increasing; in Fig. 3, the potential on VR1 arm gets lower and lower compared with that on the AW— connected to the load, it does so as a "slave" to the first power unit.

The auto-changeover from "slave" to "master" takes place when the marginal voltage relay MVR moves from its normal position owing to the excessively high output voltage demanded from the unit. In Fig. 5 it will be seen that the changeover takes place when the voltage marginal relay makes on its "high contact" H so operating HV relay which locks up over its own contacts HV1 and connects the "AW" winding at HV2, HV3, in Fig. 1, across the voltage stabilising tubes V3 and V4. It is not essential that the change takes place upon the operation of the marginal relay to its "high contact"—it could equally well be arranged to take place when the marginal relay breaks from its "low contact."

Fig. 5 is arranged so that in the event of only one unit being left on the line for the supply of the whole load, or is otherwise called upon to supply more than a certain output voltage, that unit will inevitably operate as "master," giving the predetermined controlled load current, instead of, as a "slave," a very much reduced current, which might be deleterious for certain types of load. Thus K1 and K2, non-locking and locking respectively, are manual controls for determining how the unit shall function, K1 when operated causing HV to operate and to lock (via AV1, K2), while K2 operated prevents HV locking, even if K1 is a separate key and is operated at the same time. For outputs above a predetermined output, however, MVR goes over to its H contact and operates HV irrespective of K1 or K2, and confirms the unit as a "master."

The various forms of circuit shown in Figs. 2, 3 and 4 are tabulated in Table I below with all the possible variations in components.

Table I

| | V1 | V2 | R1 | R2 | Fig. |
|---|---|---|---|---|---|
| 1 | Stabilising tube or tubes carbon fil lamp, or carbon resistor, Thermistor or like substance or any combination of the above. | Stabilising tube, carbon fil lamp or carbon resistor, Thermistor or like substance or any combination of the above. | Resistor or any type of resistor which increases in resistance with increase of current. | As for R1 | {2, 4} |
| 2 | Resistor | Resistor | Any type of resistor which increases in resistance with increase of current. | As for R1 | {2, 4} |
| 3 | As for V1 in 1 above | | As for R1 in 1 above | | 3 |
| 4 | ...do... | As for R1 in 1 above | ...do... | As for R1 in 1 above. | {2, 4} |
| 5 | As for R1 in 1 above | As for V2 in 1 above | ...do... | ...do... | {2, 4} |

MW junction. The now increasing current in AW thus adds to the controlling effect of MW, and depresses the output current while allowing the output voltage to rise steadily, the effect being as shown for b in Fig. 6.

There is little to choose between Figs. 2, 3 and 4 in practice, but Fig. 4 is the preferred arrangement. The rectifier MR2 in Fig. 4 prevents "sneak" currents from the negative return lead finding a path via VR1, R2, AW, MR1 and R1 to the positive line, and so disturbing the control.

Note that, if MR1 were removed, AW would be effective at all outputs, and the output current from the power unit could be made to increase or decrease at a predetermined rate with change of load voltage throughout the whole voltage range of the power unit and dependent upon the relative direction of current flow in AW. This is indicated in Fig. 6 by the continuation back in dashed lines to the vertical axes of the solid sloping portions of the characteristics.

The power unit is so arranged that when it is first connected to the line, it does so as a "slave." If it finds that the power unit at the other end is not connected to the line and supplying its share of the power, then it immediately becomes a "master" so that it now supplies the correct current to all the repeaters. When the power unit at the other end of the line is switched on and Various other circuit alternatives are possible, as listed below:

The coils MW and AW may either be the control coils of a magnetically controlled diode or they may be the controlling coils of a magnetic amplifier.

In Fig. 2B the coil AW may be short circuited or replaced by a resistor and the MW coil only employed for controlling the magnetically controlled diode, or with AW either short circuited or replaced by a resistor the coil MW may also be replaced by a resistor for controlling the grid of a valve, connected either directly or indirectly in the control circuit of the power unit.

The windings MW and AW may be replaced by the windings of a suitable marginal relay to permit dynamic control of the main circuit or part thereof. (In this case V3, V4, V5, R3, R4 and the control for the main magnetic amplifier are not required.)

The transductors MA are shown as a simple magnetic amplifier, but may be replaced by any other type of magnetic amplifier.

R3 may be substituted by the control coils of a high gain magnetic amplifier for controlling either directly or indirectly the main control magnetic amplifier, or R3 may be replaced by the control coil of a marginal relay to permit dynamic control of the main circuit or part thereof.

The control of the main magnetic amplifier may consist of an auxiliary amplifier, or a valve controlled unit or a combination of the two.

Some of the above arrangements will be less sensitive or less favourable than others, or the one described, but are listed as indicating the flexibility which may be achieved, and the non-dependence of the special features of the invention on the provision of particular circuit arrangements.

What we claim is:

1. Regulated electric power supply equipment for the supply of unidirectional current to a load circuit, which comprises a source of unidirectional power, means for maintaining the output load current initially constant for all output voltages up to a predetermined output voltage, means for sensing the output voltage condition, a device controlled by the sensed voltage, and means regulated by the controlled device for reducing said output load current with continued increase of output voltage up to a maximum output voltage.

2. Equipment as claimed in claim 1 and comprising switching equipment coupled to said sensing means, the switching equipment including means for changing the regulating characteristics of the equipment so that the output current of the equipment is maintained at a constant value throughout the whole range of working voltages, such value being below the said initial constant current value.

3. Regulated electric power supply equipment suitable for feeding unidirectional current to one end of an electrical signal transmission loop circuit, the other end of which is fed by another regulated power supply equipment having a constant current output characteristic over the complete working range of voltage and which comprises a source of unidirectional power, regulating means in the first said equipment for maintaining its output current to such a loop circuit constant up to a predetermined output voltage which is below the normal working voltage for such loop circuit, and means for decreasing said output current with further increase of working voltage, whereby at and around such normal working voltage the output current of said equipment will be automatically adjusted to the constant output current of such other distant power supply equipment.

4. Regulated electric power supply equipment as claimed in claim 3 and comprising detecting equipment for detecting the failure of such distant power supply equipment and switching equipment arranged to change the regulating characteristics of the equipment in response to the operation of said detecting equipment so that the output current of the equipment is maintained at a constant value throughout the whole range of working voltages equal to that formerly supplied by such distant power supply equipment.

5. Equipment as claimed in claim 4 and in which the said regulating means comprises magnetic controlling gear having a main controlling winding and an auxiliary controlling winding, and linear, non-linear, and asymmetric conducting devices so arranged that the whole of the output current passes through the main controlling winding whereas the auxiliary winding is dependent on output voltage and fails to pass current until a predetermined output voltage is attained.

6. Equipment as claimed in claim 5 and in which the said linear and said non-linear devices are arranged to form a bridge network the non-linear devices in conjugate relationship therein, which network is connected so as to bridge at one of its diagonals the source of unidirectional power, the other diagonal containing the auxiliary winding and an asymmetric conducting device suitably directed so as to prevent the flow of current therethrough for voltages below the said predetermined voltage.

7. Equipment as claimed in claim 6 and in which the said bridge network connection comprises also variable resistance means for adjusting the value of the said predetermined voltage.

8. Equipment as claimed in claim 5 and in which the said linear and non-linear conducting devices are arranged as a potentiometer bridging the source of unidirectional power, the said linear device being in contact with the input terminal of the said main winding, the auxiliary winding and a suitably directed asymmetric conducting device in series therewith being connected so as to bridge the main winding and the said linear device.

9. Equipment as claimed in claim 8 and in which the said non-linear devices comprise gaseous discharge devices.

10. Equipment as claimed in claim 9 and which comprises switching means for transferring the said auxiliary winding from a bias condition in which it is dependent on output voltage to a condition of fixed bias, wherein the equipment is adapted to regulate for constant output current under all conditions of output voltage.

11. Equipment as claimed in claim 10 and in which the said magnetic controlling gear comprises a thermionic diode provided with controlling windings for regulating the flow of cathode-anode space current.

12. Regulated electric power supply equipment for the supply of unidirectional current to a load circuit which comprises terminals for connection to an alternating current supply, alternating current rectification equipment connected to said terminals, and a saturable reactor regulating device having a main winding connected in the circuit from said terminals to said rectification equipment; load circuit terminals connected to unidirectional current output terminals of said rectification equipment in series with the main controlling winding of a magnetically controlled diode having also an auxiliary winding; a marginal voltmeter relay connected in shunt with said load terminals and set to float free of its low voltage terminal at a predetermined value of load voltage; a current controlling network bridging the said output terminals of said rectification equipment, which network comprises a pair of gas-filled regulating devices and a pair of linear resistors arranged in a Wheatstone Bridge network, like elements being in conjugate arms, one diagonal thereof being connected at one end to one of said output terminals and at its other end to a variable resistor and a unidirectional conducting device in series, the other end of said series arrangement being connected to said other output terminal, while the other diagonal of said bridge network comprises a series arrangement of a unidirectional conducting device and the said auxiliary winding, the direction of the first said unidirectional conducting device being such as to assist the flow of current through the said network while the direction of the second said unidirectional conducting device is such as to permit the flow of current through said auxiliary winding when a predetermined value of output voltage is exceeded, the direction of current flow in the said auxiliary winding being such as to assist the regulating action of the said main winding; a controlling circuit for said saturable reactor comprising a magnetic amplifier connected at its output terminals to an auxiliary winding on said saturable reactor and being controlled at its input terminals by voltage derived from the said diode; terminals for connecting said diode and said magnetic amplifier to a source of direct current; stabilising devices for stabilising the voltage of a direct current supply so connected; means under the control of said marginal relay for transferring said diode auxiliary control winding from the said bridge network to said stabilised voltage supply when said predetermined load voltage is reached; and manually controlled means for transferring said diode auxiliary winding between said stabilised supply and said network as required.

13. Regulated electric power supply system for the supply of unidirectional current at a regulated value to a load circuit, which comprises a pair of equipments as claimed in claim 12 connected so as to feed the said load circuit in tandem.

14. Regulated electric power supply system for the supply of unidirectional current at a predetermined and regulated value to a series of thermionic amplifying equipments interconnected by a telecommunication cable, wherein the unidirectional current consuming devices in the said series of equipments are arranged in a series loop interrupted at each end of the said cable for the insertion therein of a pair of regulated power supply equipments each adapted to supply the said regulated value of current either alone, or jointly with the other equipment so as to share the total load.

15. Regulated electric power supply system as claimed in claim 14 and arranged so that under conditions of joint operation by the said two supply equipments, one is adapted to operate as a "master," exercising overriding control of the load current value, the other being adapted to operate as a "slave," supplying a predetermined proportion of the total load, and further adapted to operate as a "master" on failure of the said "master" equipment.

16. Regulated electric power supply system for the supply of unidirectional current at a predetermined and regulated value to a series of thermionic amplifying equipments interconnected by a telecommunication cable, wherein the unidirectional current consuming devices in the said series of equipments are arranged in a series loop interrupted at each end of the said cable for the insertion therein of a pair of regulated electric power supply equipments as claimed in claim 12, one at each end.

References Cited in the file of this patent

UNITED STATES PATENTS

| | | |
|---|---|---|
| 2,085,060 | Young | June 29, 1937 |
| 2,405,837 | Lang | Aug. 13, 1946 |
| 2,561,202 | Houser et al. | July 17, 1951 |